United States Patent
Felton et al.

(10) Patent No.: US 8,447,892 B1
(45) Date of Patent: *May 21, 2013

(54) PCI-E EXTENDED REACH WITH RECEIVE DETECT CIRCUITRY

(75) Inventors: Mickey S. Felton, Sterling, MA (US); Simba M. Julian, Dorchester, MA (US)

(73) Assignee: EMC Corporation, Hopkinton, MA (US)

( * ) Notice: Subject to any disclaimer, the term of this patent is extended or adjusted under 35 U.S.C. 154(b) by 25 days.

This patent is subject to a terminal disclaimer.

(21) Appl. No.: 11/862,491

(22) Filed: Sep. 27, 2007

(51) Int. Cl.
*G06F 3/00* (2006.01)
*G06F 13/14* (2006.01)

(52) U.S. Cl.
USPC .................. 710/15; 710/16; 710/305

(58) Field of Classification Search
None
See application file for complete search history.

(56) References Cited

U.S. PATENT DOCUMENTS

| | | | |
|---|---|---|---|
| 6,498,535 B1 * | 12/2002 | Allen et al. | 330/307 |
| 6,763,408 B1 * | 7/2004 | Sonoda | 710/73 |
| 7,536,508 B2 * | 5/2009 | Davies | 711/114 |
| 2005/0015532 A1 | 1/2005 | Beckett et al. | |
| 2006/0129733 A1 * | 6/2006 | Sobelman | 710/305 |
| 2006/0230218 A1 | 10/2006 | Warren et al. | |
| 2007/0214299 A1 * | 9/2007 | Lo | 710/301 |
| 2007/0255857 A1 | 11/2007 | Loffink et al. | |

OTHER PUBLICATIONS

Non-Final Office Action dated Apr. 7, 2009 for U.S. Appl. No. 11/862,512 (17 pages).
Final Office Action dated Dec. 1, 2009 for U.S. Appl. No. 11/862,512 (18 pages).

* cited by examiner

*Primary Examiner* — Henry Tsai
(74) *Attorney, Agent, or Firm* — Guerin & Rodriguez, LLP

(57) ABSTRACT

A type one protocol device transmitter performs a detection function to detect attached type one protocol receivers. The detection function operates such that receivers having type two termination are not detected as type one protocol receivers. A type two protocol device receiver has type two termination. Logic is coupled between the type two protocol device receiver and the type one protocol device transmitter so that the type one protocol device transmitter detection function detects the type two protocol device receiver as a type one protocol receiver. The type one protocol device can be a PCI-E device, and the type two protocol device can be a SAS/SATA device.

19 Claims, 8 Drawing Sheets

PCI-E EXTENDED REACH WITH RECEIVE DETECT CIRCUITRY

FIELD OF THE INVENTION

The invention relates to high performance interconnect architectures, and particularly to mechanisms for coupling devices of different interconnect protocols.

CROSS REFERENCE TO RELATED APPLICATIONS

This Application is related to and commonly assigned Utility Patent Application "DATA STORAGE SYSTEM WITH PCI-E EXTENDED REACH CAPABILITY", by Mickey S. Felton and Simba M. Julian, application Ser. No. 11/862,512, filed on the same day herewith.

BACKGROUND OF THE INVENTION

Serial interconnects such as the PCI-Express® interconnect (PCI-E) are used in high performance systems such as today's data storage systems as high speed memory and I/O interconnects. (PCI-Express® is a registered trademark of PCI-SIG.) transfers data via differential signal pairs called "Lanes". In order to transmit very high speed signals that can be cleanly received, the physical run lengths of the differential signal pairs are limited. In order to extend the run lengths of the PCI-E signals, a PCI-E bridge or switch is typically used. These devices are expensive and incorporate buffering that adds latency into the signal path—latency that is often unacceptable in high performance system designs.

SUMMARY OF THE INVENTION

In accordance with the invention, logic is provided to allow a transmitter in a type one protocol device to recognize a receiver in a type two protocol device as a receiver of the type one protocol. The type two protocol device can thus be used to extend the type one protocol interconnect. This allows low cost, low latency devices to be used to as interconnect extenders. For example, a SAS/SATA receiver can be used to extend a PCI-E interconnect.

In particular, a type one protocol device transmitter performs a detection function to detect attached type one protocol receivers. The detection function operates such that receivers having type two termination are not detected as type one protocol receivers. A type two protocol device receiver has type two termination. Logic is coupled between the type two protocol device receiver and the type one protocol device transmitter so that the type one protocol device transmitter detection function detects the type two protocol device receiver as a type one protocol receiver. In one embodiment, the type one protocol device is a PCI-E device, and the type two protocol device is a SAS/SATA device. The transmitter and receiver are differential, and the logic for each signal line of the differential pair includes a capacitor in series, and a ferrite and resistor in parallel.

DETAILED DESCRIPTION OF EXEMPLARY EMBODIMENTS

Figure 1:
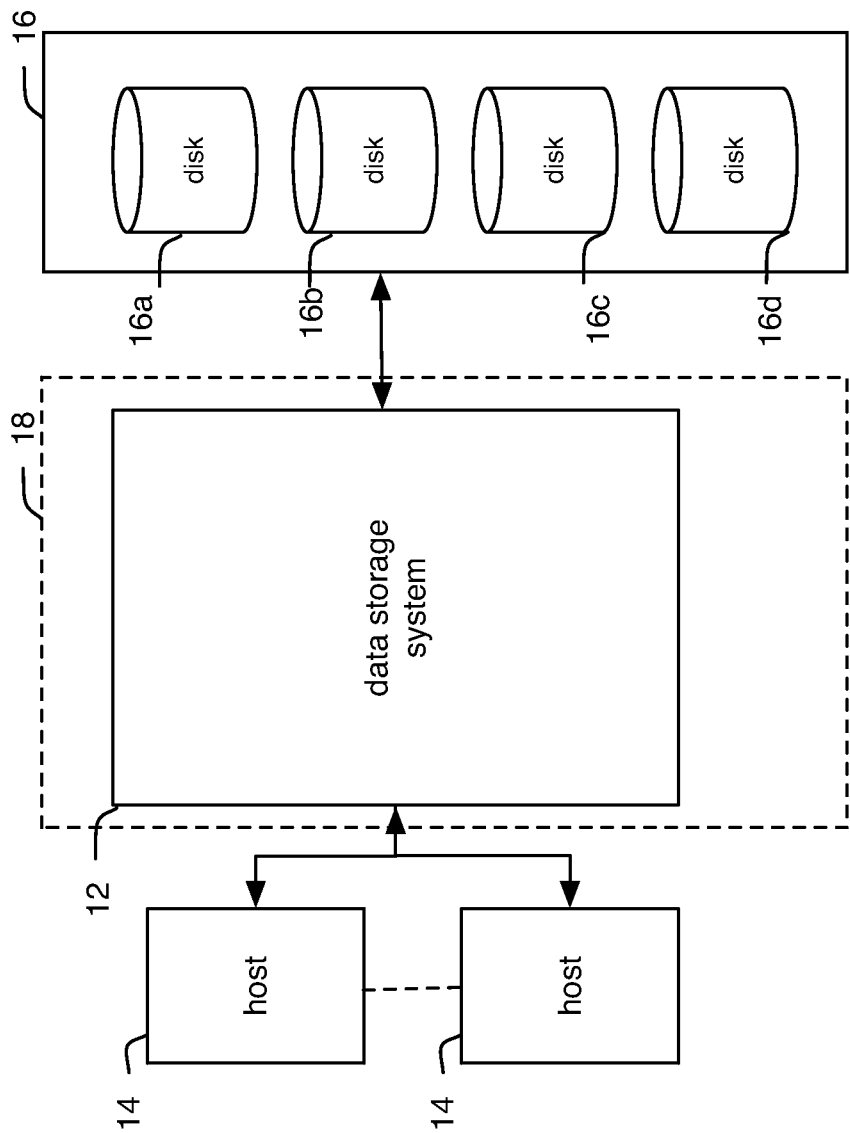
FIG. 1 is a schematic diagram of a data processing system in which the invention can be employed.

Referring to FIG. 1, a data processing system 10 includes a high performance data storage system 12 coupled to hosts 14 and to disk storage 16 (16a ... 16d). The disk storage 16 may reside with the chassis 18 of the data storage system 12 or it may reside external to it. The hosts 14 and data storage system 12 may communicate via many known front end protocols such as Fibre Channel, 10G Ethernet, etc. The data storage system 12 and disk storage 16 may communicate via many known back end protocols such as Fibre Channel, SAS, SATA, etc.

High performance systems such as the data processing system 10 of FIG. 1 often employ high performance interconnects such as PCI Express, Fibre Channel, SAS, SATA, etc. Different interconnect protocols have their advantages and disadvantages, and they are not generally interoperable. At times it is desirable to use a device designed for use with one protocol with a device designed for use with another protocol, perhaps in order to minimize latency and/or cost. In accordance with the invention as further described herein, logic is provided to allow a transmitter in a type one protocol device to recognize a receiver in a type two protocol device as a receiver of the type one protocol. This allows the type two protocol device to be used, for instance, to extend the length of the type one protocol interconnect. In the exemplary embodiments, a SAS/SATA receiver is recognized as a PCI-E receiver, and thus can be used to extend a PCI-E interconnect.

Figure 2:
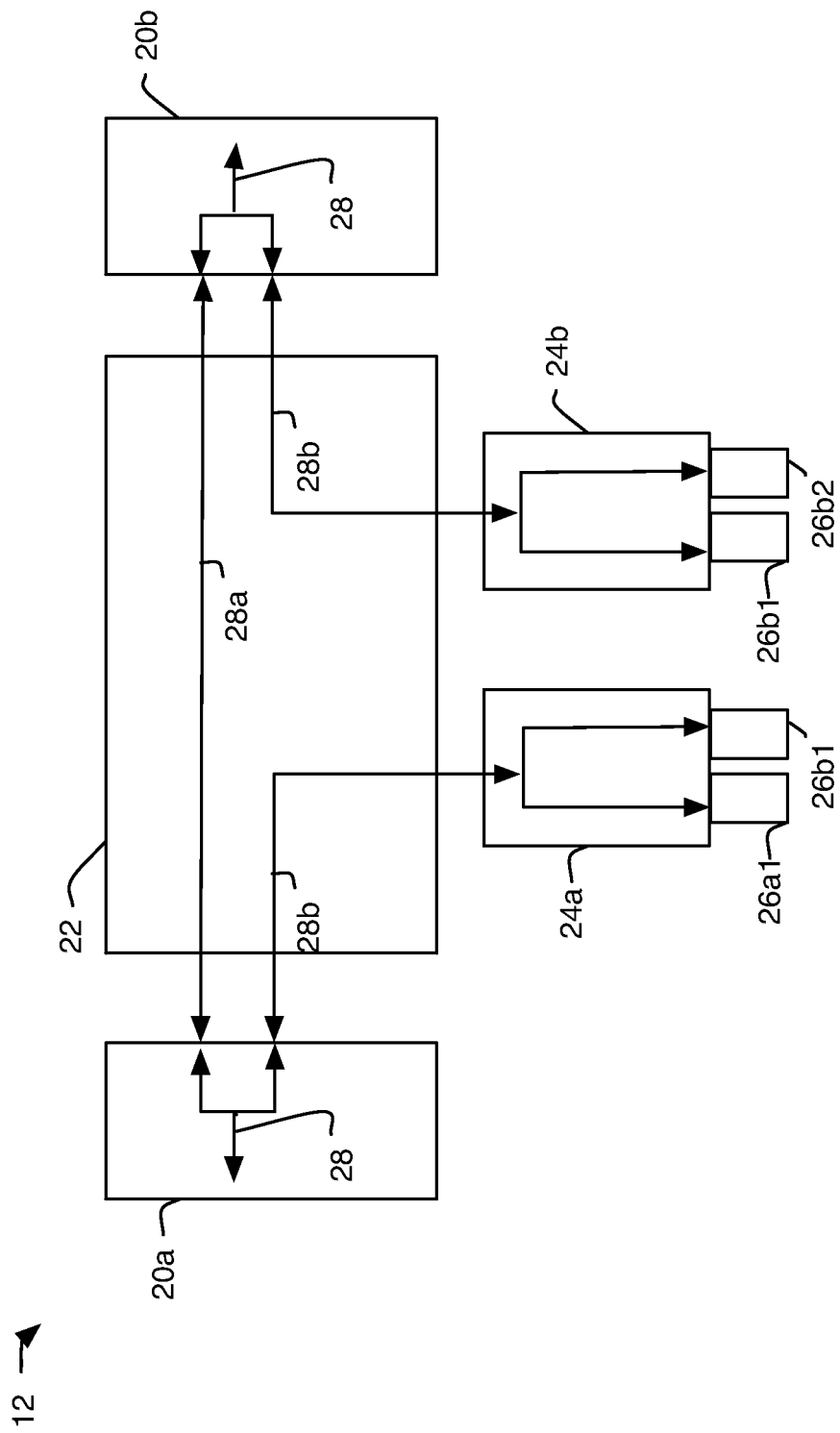
FIG. 2 is a schematic diagram of the data storage system of FIG. 1.

Referring to FIG. 2, the data storage system 12 of FIG. 1 is shown to be of the highly available type available from EMC Corporation in Hopkinton, Mass. across its product lines. The system 12 includes dual processor blades 20a, 20b coupled to a midplane 22. I/O boards 24a, 24b are also coupled to the midplane 22. I/O devices 26a1, 26a2, and 26b1, 26b2 may be further coupled to the I/O boards 24a, 24b, respectively. The blades 20a, b and I/O boards 24a, b are all interconnected over the midplane 22 via a high performance interconnect 28. The interconnect 28 is sourced from the blades 20a, b and is switched between interconnects 28a, 28b across the midplane. The high performance interconnect 28 is preferably a serial interconnect such as the PCI Express® interconnect (hereinafter "PCI-E"), fully described in the PCI Express Base Specification Revision 1.1. It is desirable to use PCI-E as the communications protocol between the processor blades 20a, b and I/O boards 24a, b and attachments 26 for its performance advantages; however, PCI-E signal lengths are limited. For example, in order to run the PCI-E interconnect 28b across the midplane 22 and I/O boards 24 to attached devices 26, another PCI-E switch or bridge would traditionally be placed on the I/O boards 24—but for many applications this solution has unacceptably high latency. Therefore, in accordance with the invention, logic including a device of a different protocol is used to extend the PCI-E interconnect 28 across the I/O boards 24a, b.

Figure 3:
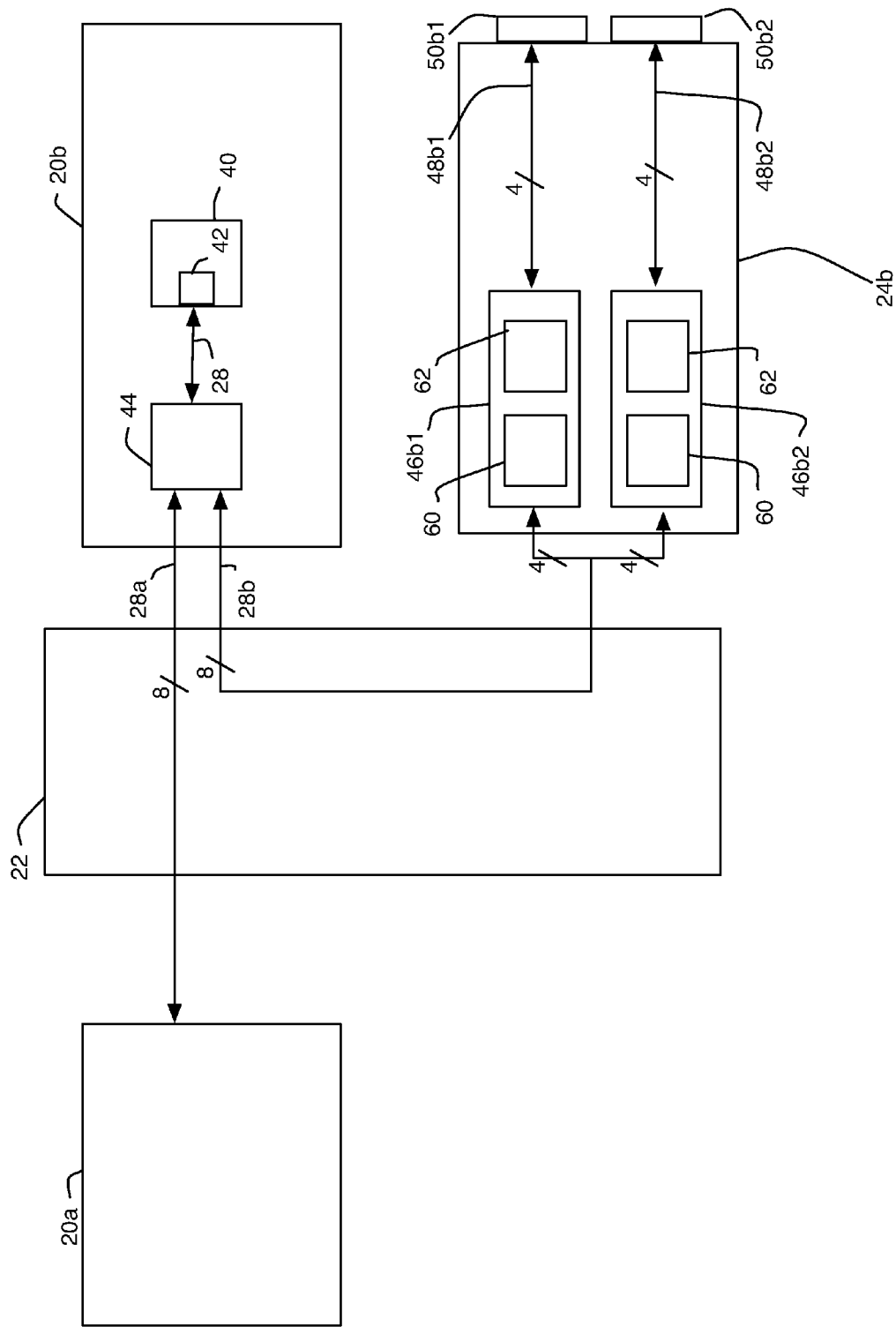
FIG. 3 is a schematic diagram of a blade, the midplane, and an I/O board of FIG. 2 incorporating the invention.

Referring to FIG. 3, the blade 20b, midplane 22, and I/O board 24b are shown in more detail. The blade 20b is shown to include a processor 40 having PCI-E root complex 42 coupled to a PCI-E switch 44 via PCI-E lanes 28. Lanes 28a, herein shown as 8 lanes though it is understood that any valid number of PCI-E lanes could be run, are coupled from the PCI-E switch 44 across the midplane 22 to a similar PCI-E switch (not shown) on the processor blade 20a. These lanes 28a are used for inter-processor communication between the blades 20b and 20a. A second set of lanes 28b, herein shown as 8 lanes though it is understood that any valid number of PCI-E lanes could be run, are coupled from the PCI-E switch 44 across the midplane 22 to the I/O board 24b, where they are coupled to a set of signal buffers 46b1, 46b2. Each signal buffer 46b1, 46b2 receives 4 lanes of the 8 PCI-E lanes 28b. PCI-E lanes 48b1, 48b2, each also 4 lanes wide, are coupled between signal buffers 46b1, 46b2 and connectors 50b1, 50b2 on the I/O board 24b. I/O devices 26b1, 26b2 (FIG. 2) may be coupled to the PCI-E lanes 48b1, 48b2 via connectors 50b1, 50b2 respectively.

The signal buffers 46b1, 46b2 are shown to include receive detect logic 60 and serial buffer 62. The serial buffer 62 is of the type used to buffer and sometimes switch serial differential data signals of a different protocol than PCI-E—such as SAS and SATA signals. This is a low cost buffer with very low latency as compared to available PCI-E switches. One example of such a serial buffer is the PM8380 from PMC Sierra. In this application, the PM8380 switching (multiplexing) function is not used; it is used solely as a buffer. If used to buffer the PCI-E signals from the blade 20b across the I/O board 24b, latency requirements can be met and all PCI-E specifications for link training and full speed signaling (2.5 Gb/s per link) are also met. But, it has been found that this type of buffer cannot be used stand-alone to buffer PCI-E signals because the PCI-E transmitters cannot recognize the SAS/SATA receivers as valid PCI-E capable receivers for the following reason.

Figure 4:
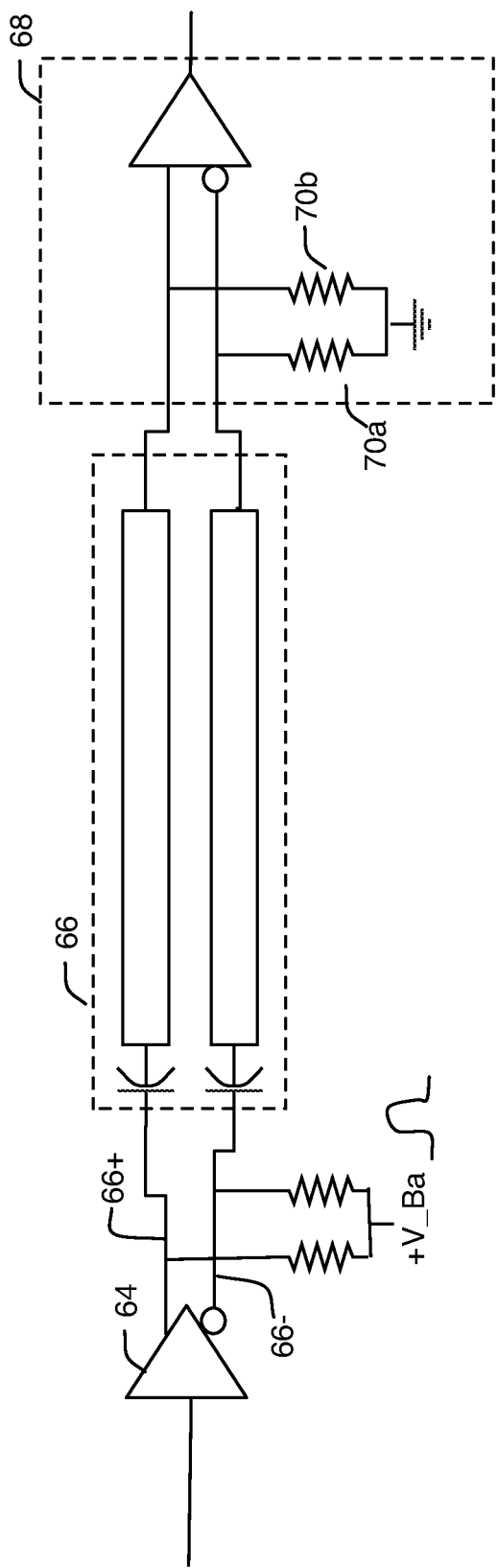
FIG. 4 is a schematic diagram of a PCI-E transmitter and receiver model for PCI-E receive detect.

The PCI-E protocol includes a Receive Detect function. Referring to FIG. 4, there is shown a PCI-E transmission line including PCI-E differential transmitter 64, transmission line 66, and PCI-E differential receiver 68. The receiver 68 is a 100 ohm receiver functionally consisting of two 50 ohm resistors 70a, 70b, each coupled to ground. The PCI-E Receive Detect function operates by sending via the transmitter 64 a common mode signal (i.e. a positive voltage pulse herein shown as +V_Ba) down each signal line of the differential pair 66. If a PCI-E receiver such as 68 is coupled to the PCI-E transmitter 64, each transmission line 66+, 66− will slowly charge over time through the line capacitance and each 50 ohm termination resistor 70b, 70a to ground. If no PCI-E receiver is coupled to the PCI-E transmitter 64, no charging will occur and the circuit will appear open. In this case, the PCI-E circuitry will not proceed to training. The line voltage rise time constant difference between the receiver termination being present and not present is quite large and differs by about ~40×, with a specified minimum of 25×.

Figure 5:
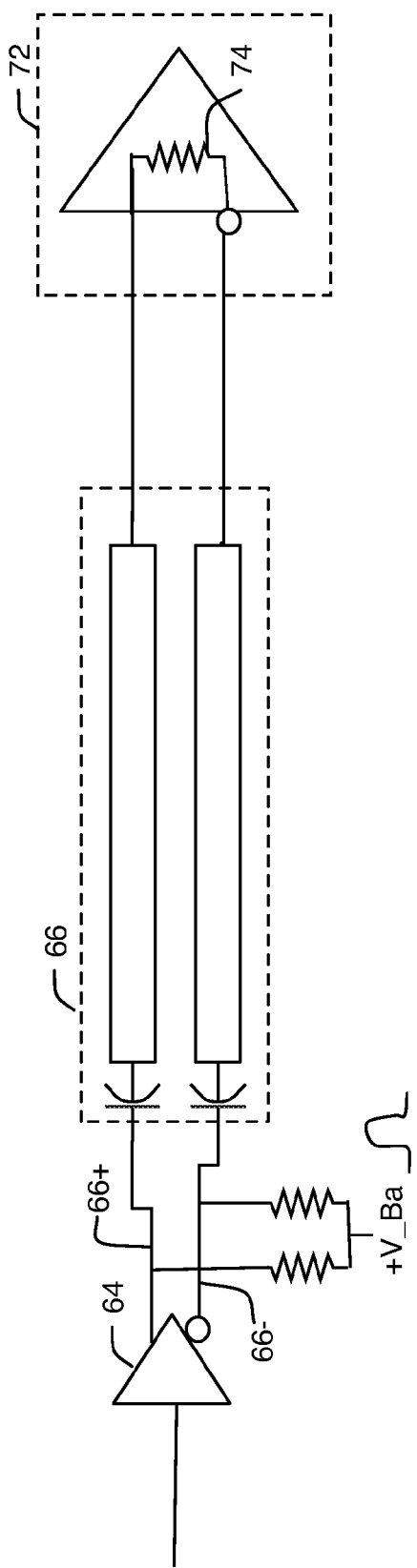
FIG. 5 is a schematic diagram of a PCI-E transmitter and SAS/SATA receiver model for PCI-E receive detect.

In FIG. 5, there is shown a similar transmission line as it would appear if including a SAS/SATA differential receiver 72 as would be found in the serial buffer 62 instead of a PCI_E receiver like 68. The SAS/SATA receiver 72 is a 100 ohm differential receiver functionally consisting of a 100 ohm resistor 74 coupled between the differential pair. Now, during the PCI-E Receive Detect function, when the common mode voltage receive detect signal is sent, no charging will occur across the resistor 74. The connection will appear as an open circuit. The transmitter will not recognize that a receiver is connected, and further training will not take place, even though the SAS/SATA serial buffer 62 is functionally capable of buffering the PCI-E signals during link training and full speed operation.

Figure 6:
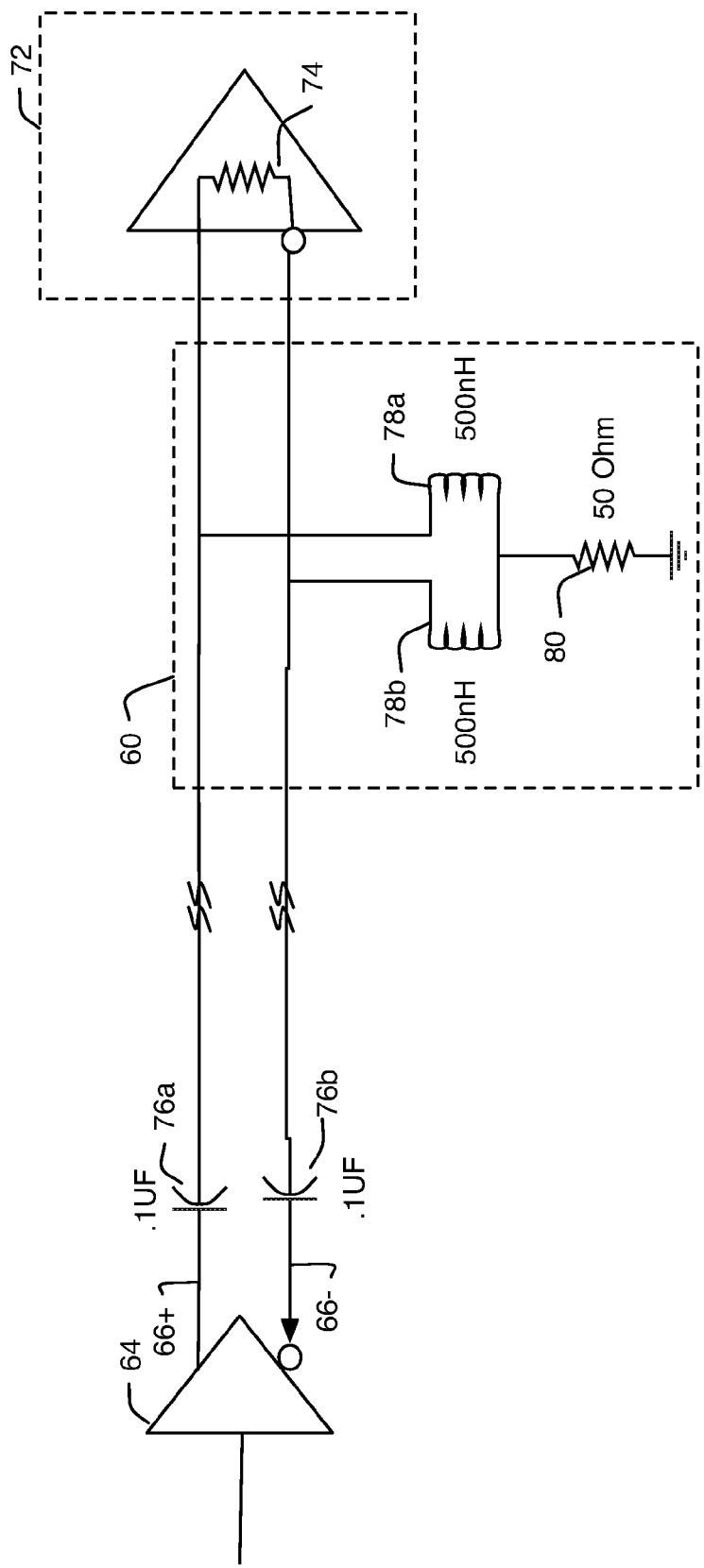
FIG. 6 is a schematic diagram of the invention.

In accordance with the principles of the invention, the receive detect logic 60 is coupled between the PCI-E switch 44 and the serial buffer 62 so that the PCI-E receive detect function detects the SAS/SATA receiver 72 in the serial buffer 62 as a valid PCI-E receiver. In FIG. 6, there is shown a PCI-E transmitter 64, such as would be found in the PCI-E switch 44, coupled to a SAS/SATA type receiver 72, such as would be found in the serial buffer 62. Each signal 66+, 66− of the differential pair between transmitter 64 and receiver 72 is shown. DC decoupling capacitors 76a, 76b are also shown. The receive detect logic 60 is coupled in parallel between the transmitter 64 and receiver 72. Within the receive detect logic 60, each signal 66+ and 66− of the differential pair is coupled in parallel to ground via a ferrite 78a, 78b and a resistor 80. The values herein shown for the ferrites are 500 nH, and for resistor 50 ohm. The receive detect logic 60 presents a low impedance path to ground during the low frequency receive detect function performed by the PCI-E transmitter. Thus, the 50 ohm resistor charges during the PCI-E receive detection function, and a valid PCI-E receiver is recognized. Once the line is charged, the receive detect logic 60 presents a high impedance path (about 1K ohm) during the high frequency link training and operational times, thus effectively removing the logic 60 from the circuit and minimizing signal integrity impact during high frequency operations. The values for the ferrites and resistor are not fixed at the values shown and can be changed as design requirements dictate as long as impedance and signal integrity requirements are met during low frequency receive detection and high frequency link training and operational phases. It has been found through experiment that signal integrity effects in one application were minimized by placing the logic 60 near the DC decoupling capacitors 76a, 76b. Advantageous results have also been obtained by placing the logic 60 midway between the transmitter 64 and receiver 72.

Figure 7:
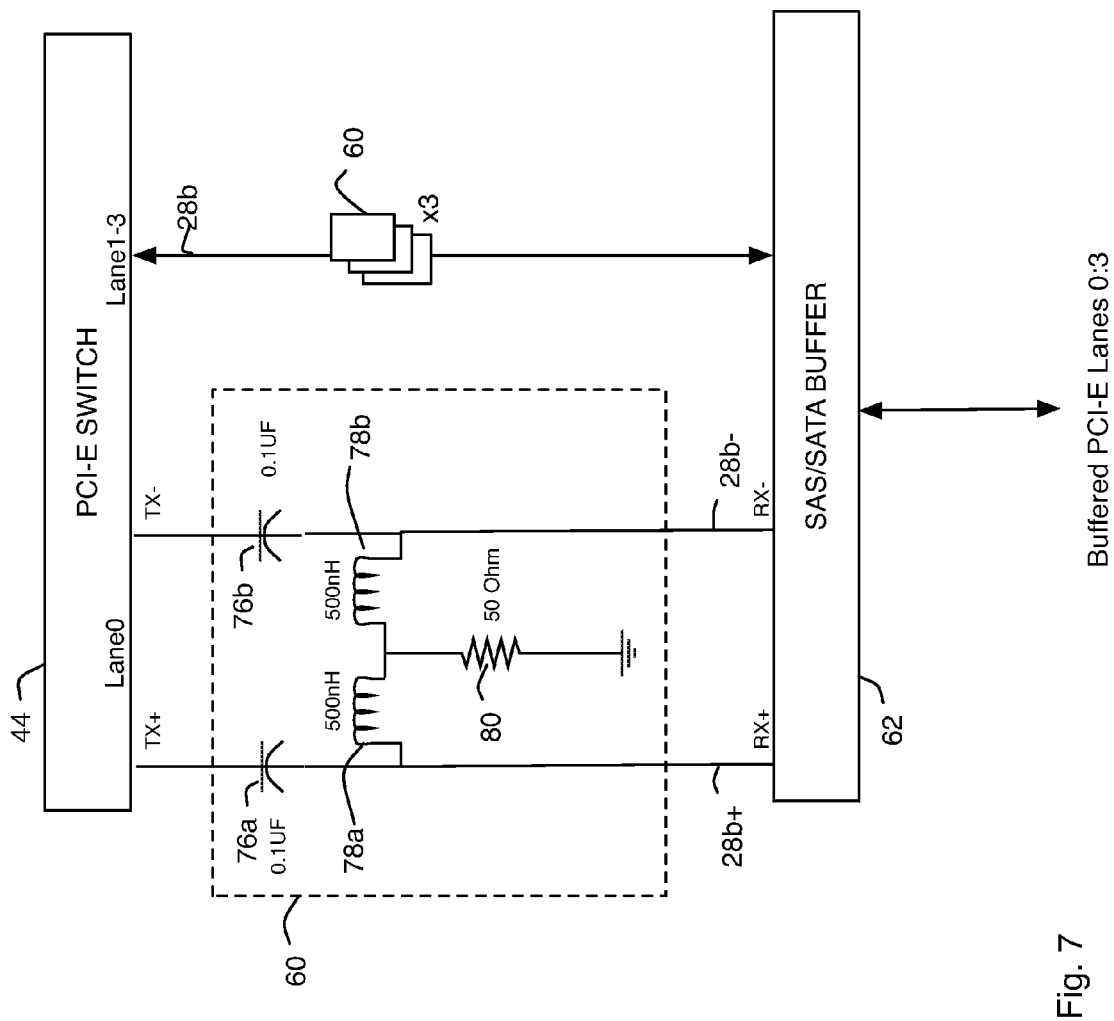
FIG. 7 is a schematic diagram of the invention incorporated between a PCI-E switch and a SAS/SATA buffer.

In FIG. 7, there is shown the invention as implemented between the PCI-E switch 44 and the SAS/SATA serial buffer 62 of FIG. 3. The PCI-E switch 44 and SAS/SATA serial buffer 62 are coupled via lanes of differential signals 28b, herein shown to be 4 lanes. The receive detect logic 60 is implemented on each of the 4 lanes 28b. One of the lanes 28b is shown in further detail as its differential pair 28b+ and 28b−. Within the receive detect logic 60, each signal 28b+ and 28b− of the differential pair is coupled to ground via a ferrite 78a, b, respectively, and a resistor 80.

Figure 8:
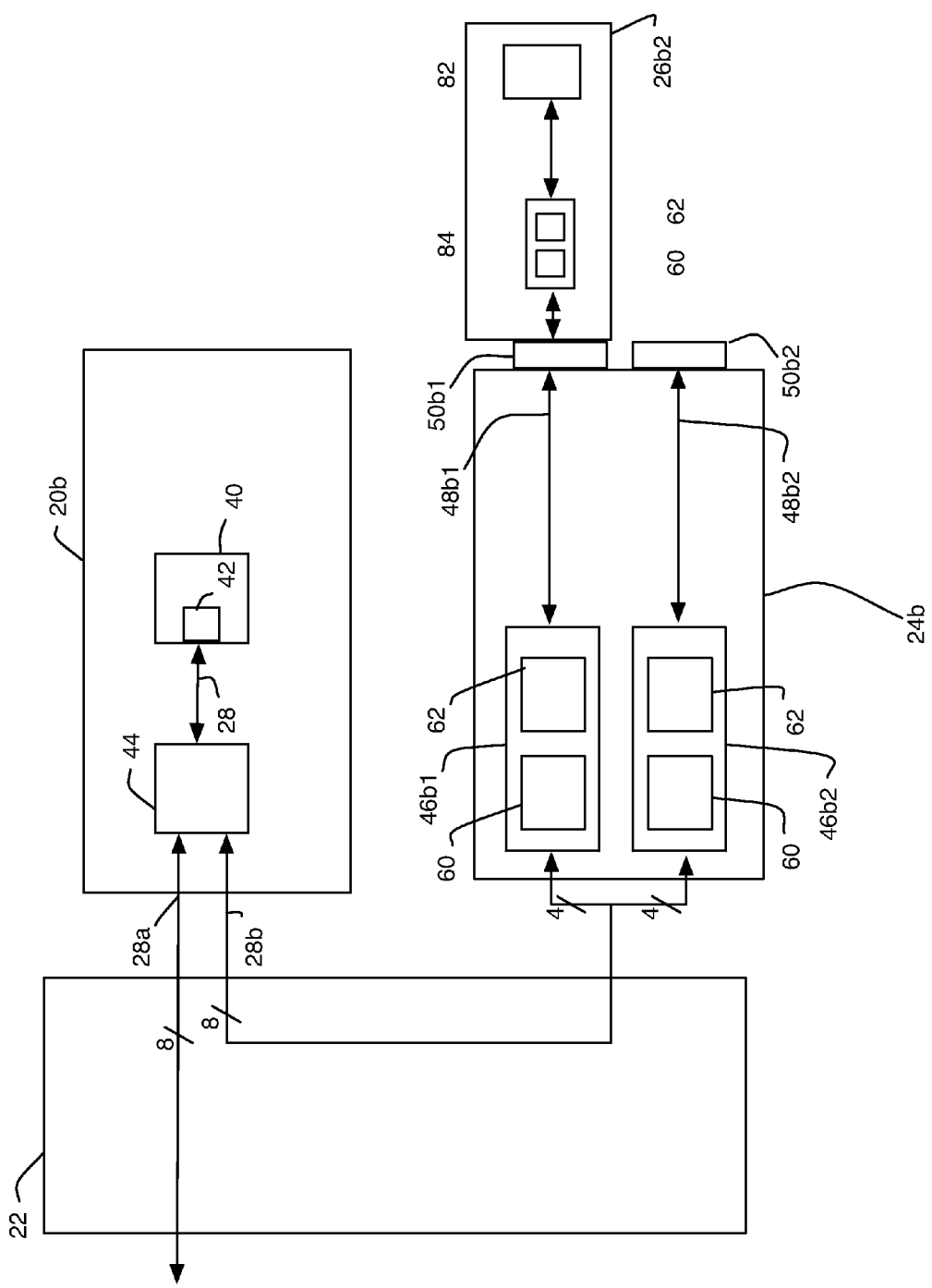
FIG. 8 is a schematic diagram of the invention used to extend a PCI-E interconnect.

FIG. 8 shows how the invention can be used to further extend a PCI-E interconnect. FIG. 8 shows the system of FIG. 3 with an I/O device 26b2 plugged in to the I/O board connector 50b1. The I/O device includes a PCI-E endpoint device 82. A signal buffer 84 in accordance with the invention is placed between the connector 50b1 and the device 82. The signal buffer 84 includes receive detect logic 60 and serial buffer 62. Serial buffer 62 is a non-PCI-E type buffer, but the receive detect logic 60 ensures that upstream PCI-E transmitters will detect the buffer 62 receivers as valid PCI-E receivers. In this manner, the PCI-E interconnect is further extended.

In accordance with the embodiments herein shown the receive detect logic 60 provides a way to extend a PCI-E interconnect through devices of a different, less expensive protocol device with lower latency, using very few components, in a way that has minor signal integrity impact. In general, the logic of the invention allows a transmitter in a type one protocol device, herein embodied as a PCI-E device, to recognize a receiver in a type two protocol device, herein embodied as a SAS/SATA device, as a receiver of the type one protocol. It can be seen that the invention can be employed wherever a type one protocol device transmitter performs a detection function to detect attached type one protocol receivers, and wherein the detection function operates such that receivers having type two termination are not detected as type one protocol receivers. The logic of the invention is coupled between the type two protocol device receiver and the type one protocol device transmitter so that the type one protocol device transmitter detection function detects the type two protocol device receiver as a type one protocol receiver.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the invention. Furthermore, many functions described herein may be implemented in hardware or in software. Further, although aspects of the present invention have been described herein in the context of a particular implementation in a particular environment for a particular purpose, those of ordinary skill in the art will recognize that its usefulness is not limited thereto and that the present invention can be beneficially implemented in any number of environments for any number of purposes.

We claim:

1. An Apparatus comprising:
    a type one protocol device physical layer transmitter that performs a physical layer detection function to detect type one protocol device physical layer receivers attached via an interconnect, said detection function operating such that in response to a signal sent from the physical layer detection function, physical layer receivers having type one physical layer termination cause the interconnect to charge and physical layer receivers having type two physical layer termination appear as an open circuit to said physical layer detection function;
    a type two protocol device physical layer receiver having type two physical layer termination, the type two protocol device physical layer receiver being connected to the type one protocol device physical layer transmitter by at least one differential signal pair; and
    logic functional such that when said logic is coupled to the at least one differential signal pair between the type two protocol device physical layer receiver and the type one protocol device physical layer transmitter, the type one protocol device physical layer transmitter detection function detects the type two protocol device physical layer receiver as a type one protocol device physical layer receiver by causing the at least one differential signal to charge in order to indicate that the type two protocol device physical layer receiver is a valid type one protocol device physical layer receiver and to enable the type two protocol device physical layer receiver to functionally receive type one protocol communications directly from the type one protocol device physical layer transmitter over the at least one differential signal pair.

2. The Apparatus of claim 1 wherein the type one protocol device physical layer transmitter is a PCI-E device physical layer transmitter.

3. The Apparatus of claim 2 wherein the type two protocol device physical layer receiver is a SAS/SATA device physical layer receiver.

4. The Apparatus of claim 3 wherein the type one protocol device physical layer transmitter and type two protocol device physical layer receiver are differential, and wherein the logic further comprises for each signal line of the at least one differential signal pair:
    a ferrite and resistor in parallel.

5. The Apparatus of claim 1, wherein the type two protocol device physical layer receiver includes buffers capable of buffering signals received from the type one protocol device physical layer transmitter.

6. The Apparatus of claim 1, wherein the type two protocol device physical layer receiver extends the interconnect to another interconnect for carrying the signals received from the type one protocol device physical layer transmitter.

7. The Apparatus of claim 1, wherein the logic, by causing the at least one differential signal pair to charge, enables the type two protocol device physical layer receiver to perform link training with the type one protocol device physical layer transmitter.

8. An Apparatus comprising:
    logic coupled to a differential signal pair that connects a PCI-E physical layer transmitter of a PCI-E device to a SAS/SATA physical layer receiver, the logic causing the PCI-E physical layer transmitter to recognize the SAS/SATA physical layer receiver as a valid PCI-E receiver by causing the differential signal pair to charge upon transmission of a PCI-E physical layer transmission to indicate to the PCI-E device that the SAS/SATA physical layer receiver is a valid PCI-E receiver and to enable the SAS/SATA physical layer receiver to functionally receive communications directly from the PCI-E physical layer transmitter over the differential signal pair.

9. The apparatus of claim 8 wherein the logic comprises:
    a ferrite and resistor in parallel with each signal line of the differential signal pair between the transmitter and receiver.

10. The Apparatus of claim 8, wherein the SAS/SATA physical layer receiver includes buffers capable of buffering the communications received from the PCI-E transmitter over the differential signal pair.

11. The Apparatus of claim 8, wherein the SAS/SATA physical layer receiver provides an interconnect extension from the differential signal pair to another differential signal pair for carrying the communications received from the PCI-E physical layer transmitter.

12. The Apparatus of claim 8, wherein the logic, by causing the differential signal pair to charge, enables the SAS/SATA physical layer receiver to perform link training with the PCI-E physical layer transmitter.

13. A method comprising the steps of:
    providing a type one protocol device physical layer transmitter that performs a physical layer detection function to detect type one protocol device physical layer receivers attached via an interconnect, said detection function operating such that in response to a signal sent from the physical layer detection function, physical layer receivers having type one physical layer termination cause the interconnect to charge so physical layer receivers having type two physical layer termination appear as an open circuit to said physical layer detection function;
    providing a type two protocol device physical layer receiver having type two physical layer termination, the type two protocol device physical layer receiver being connected to the type one protocol device physical layer transmitter by at least one differential signal pair; and
    coupling logic to the at least one differential signal pair between the type two protocol device physical layer receiver and the type one protocol device physical layer transmitter, the logic functional to cause the type one protocol device transmitter physical layer detection function to detect the type two protocol device physical layer receiver as a type one protocol device physical layer receiver by causing the at least one differential signal pair to charge to indicate that the type two protocol device physical layer receiver is a valid type one protocol device physical layer receiver and to enable the type two protocol device physical layer receiver to functionally receive type one protocol communications directly from the type one protocol device physical layer transmitter over the at least one differential signal pair.

14. The method of claim 13 wherein the type one protocol device physical layer transmitter is a PCI-E device physical layer transmitter.

15. The method of claim 14 wherein the type two protocol device physical layer receiver is a SAS/SATA device physical layer receiver.

16. The method of claim 15 wherein the type one protocol device physical layer transmitter and type two protocol device physical layer receiver are differential, and wherein the step of coupling logic further comprises the step of coupling logic for each signal line of the at least one differential signal pair comprising:

a ferrite and resistor in parallel.

17. The method of claim 13, further comprising buffering, by the type two protocol device physical layer receiver, signals received from the type one protocol device physical layer transmitter.

18. The method of claim 13, wherein extending, by the type two protocol device physical layer receiver, the interconnect to another interconnect for carrying the signals received from the type one protocol device physical layer transmitter.

19. The method of claim 13, further comprising enabling, by the charging of the at least one differential signal pair, link training between the type two protocol device physical layer receiver and the type one protocol device physical layer transmitter.

\* \* \* \* \*